(12) United States Patent
Tiesman et al.

(10) Patent No.: US 9,442,001 B2
(45) Date of Patent: Sep. 13, 2016

(54) LIQUID LEVEL MONITORING FOR RESERVOIRS

(71) Applicant: LONE STAR LEAK DETECTION, LLP, Greenville, TX (US)

(72) Inventors: Diana C. Tiesman, Greenville, TX (US); Robert C. McDonald, Dewey, AZ (US)

(73) Assignee: LONE STAR LEAK DETECTION, LLP, Greenville, TX (US)

( * ) Notice: Subject to any disclaimer, the term of this patent is extended or adjusted under 35 U.S.C. 154(b) by 0 days.

(21) Appl. No.: 14/988,170

(22) Filed: Jan. 5, 2016

(65) Prior Publication Data

US 2016/0231159 A1 Aug. 11, 2016

(30) Foreign Application Priority Data

Feb. 11, 2015 (WO) ................ PCT/US2015/015410

(51) Int. Cl.
 *G01F 23/30* (2006.01)
(52) U.S. Cl.
 CPC ..................................... *G01F 23/30* (2013.01)
(58) Field of Classification Search
 CPC ....................................................... G01F 23/30
 See application file for complete search history.

(56) References Cited

U.S. PATENT DOCUMENTS

| | | | |
|---|---|---|---|
| 3,538,746 A | 11/1970 | Jacobs et al. | |
| 3,935,741 A | 2/1976 | Zinsmeyer et al. | |
| 4,024,376 A | 5/1977 | Redel | |
| 4,186,591 A | 2/1980 | Mooney | |
| 4,373,815 A | 2/1983 | Bruce | |
| 4,404,844 A | 9/1983 | Hegler | |
| 4,646,560 A | 3/1987 | Maresca, Jr. et al. | |
| 4,679,425 A | 7/1987 | Bolland | |
| 4,732,035 A | 3/1988 | Lagergren et al. | |
| 4,739,648 A | 4/1988 | Horner | |
| 4,850,223 A | 7/1989 | Carlin et al. | |
| 4,862,733 A | 9/1989 | Hyfantis, Jr. et al. | |
| 4,862,734 A | 9/1989 | Elderton | |

(Continued)

FOREIGN PATENT DOCUMENTS

JP 59100822 A * 6/1984

OTHER PUBLICATIONS

Bucket Test—Test your pool for leaks, http://www.americanleakdetection.com/tips-bucket-test.php, downloaded Jan. 17, 2015, 5 pages.

(Continued)

*Primary Examiner* — Paul West
(74) *Attorney, Agent, or Firm* — Smith IP Services, P.C.

(57) ABSTRACT

A system for monitoring a liquid level in a reservoir can include another reservoir and a liquid level monitoring apparatus, the apparatus including two float devices, with each of the float devices measuring the liquid level relative to a respective one of the reservoirs. Another liquid level monitoring apparatus can include two laterally spaced apart elongated float guides, two float devices at least partially reciprocably disposed relative to the respective float guides, and an alignment structure that maintains lateral separation and longitudinal alignment of the float guides. A monitoring method can include positioning one reservoir in another reservoir, and partially immersing a liquid level monitoring apparatus in both of the reservoirs, the apparatus including two float devices, each of the float devices thereby measuring a level of the liquid in a respective one of the reservoirs.

13 Claims, 6 Drawing Sheets

(56) References Cited

U.S. PATENT DOCUMENTS

| | | |
|---|---|---|
| 4,873,863 A | 10/1989 | Bruhl et al. |
| 4,939,457 A | 7/1990 | Tellerman |
| 4,972,710 A | 11/1990 | Uhlarik et al. |
| 5,095,739 A | 3/1992 | Hedtke |
| 5,156,042 A | 10/1992 | Carlin et al. |
| 5,551,290 A | 9/1996 | Spiegel |
| 6,851,314 B2 | 2/2005 | Bromley |
| 7,004,011 B1 | 2/2006 | Spiegel |
| 7,162,923 B1 | 1/2007 | Masoner et al. |
| 7,536,900 B2 | 5/2009 | Nakamura et al. |
| 7,581,432 B2 | 9/2009 | Russell |
| 8,220,482 B1 | 7/2012 | Deverse et al. |
| 8,893,543 B2 | 11/2014 | Bohn et al. |
| 2006/0096369 A1 | 5/2006 | Fling et al. |
| 2009/0038393 A1 | 2/2009 | Chaung et al. |
| 2009/0223284 A1 | 9/2009 | Bühring |
| 2010/0064777 A1 | 3/2010 | Howieson |
| 2010/0095744 A1 | 4/2010 | Johnson |
| 2010/0218601 A1 | 9/2010 | Mahadevaiah |
| 2010/0315245 A1 | 12/2010 | Wofford |
| 2011/0048110 A1 | 3/2011 | Raymond |
| 2011/0214490 A1 | 9/2011 | Sakita |
| 2013/0291974 A1 | 11/2013 | Bourgeois |
| 2013/0333447 A1 | 12/2013 | White et al. |
| 2014/0121999 A1 | 5/2014 | Bracken et al. |
| 2014/0123732 A1 | 5/2014 | Walter et al. |
| 2014/0125052 A1 | 5/2014 | McAlister |

OTHER PUBLICATIONS

Check a Leak Automatic Leak Detector product brochure and instructions, dated prior to Feb. 2015, 4 pages.
Do-It-Yourself Pool Leak Test—The Bucket Test, http://leakingpools.com/leak-detection/the-bucket-test/, downloaded Jan. 7, 2015, 4 pages.
Search Report and Written Opinion issued Oct. 23, 2015 for International Application No. PCT/US15/15410 filed Feb. 11, 2015, 11 pages.

\* cited by examiner

LIQUID LEVEL MONITORING FOR RESERVOIRS

CROSS-REFERENCE TO RELATED APPLICATION

This application claims the benefit under 35 USC §119 of the filing date of International Application Serial No. PCT/US15/15410 filed 11 Feb. 2015. The entire disclosure of this prior application is incorporated herein by this reference.

BACKGROUND

This disclosure relates generally to equipment utilized and operations performed in conjunction with liquid reservoirs and, in one example described below, more particularly provides an apparatus, system and method for measuring liquid levels over time in separate reservoirs.

It can be extremely difficult to determine a cause for changes in reservoir liquid levels over time. For example, a liquid level change could be due to evaporation, rain, leakage, addition, removal or other causes. In order to mitigate undesired level changes (such as, due to leakage or evaporation, etc.), it is important to identify whether or not such undesired level changes exist. For these and other reasons, it will be appreciated that advancements are continually needed in the art of level monitoring for liquid reservoirs.

DETAILED DESCRIPTION

Figure 1:
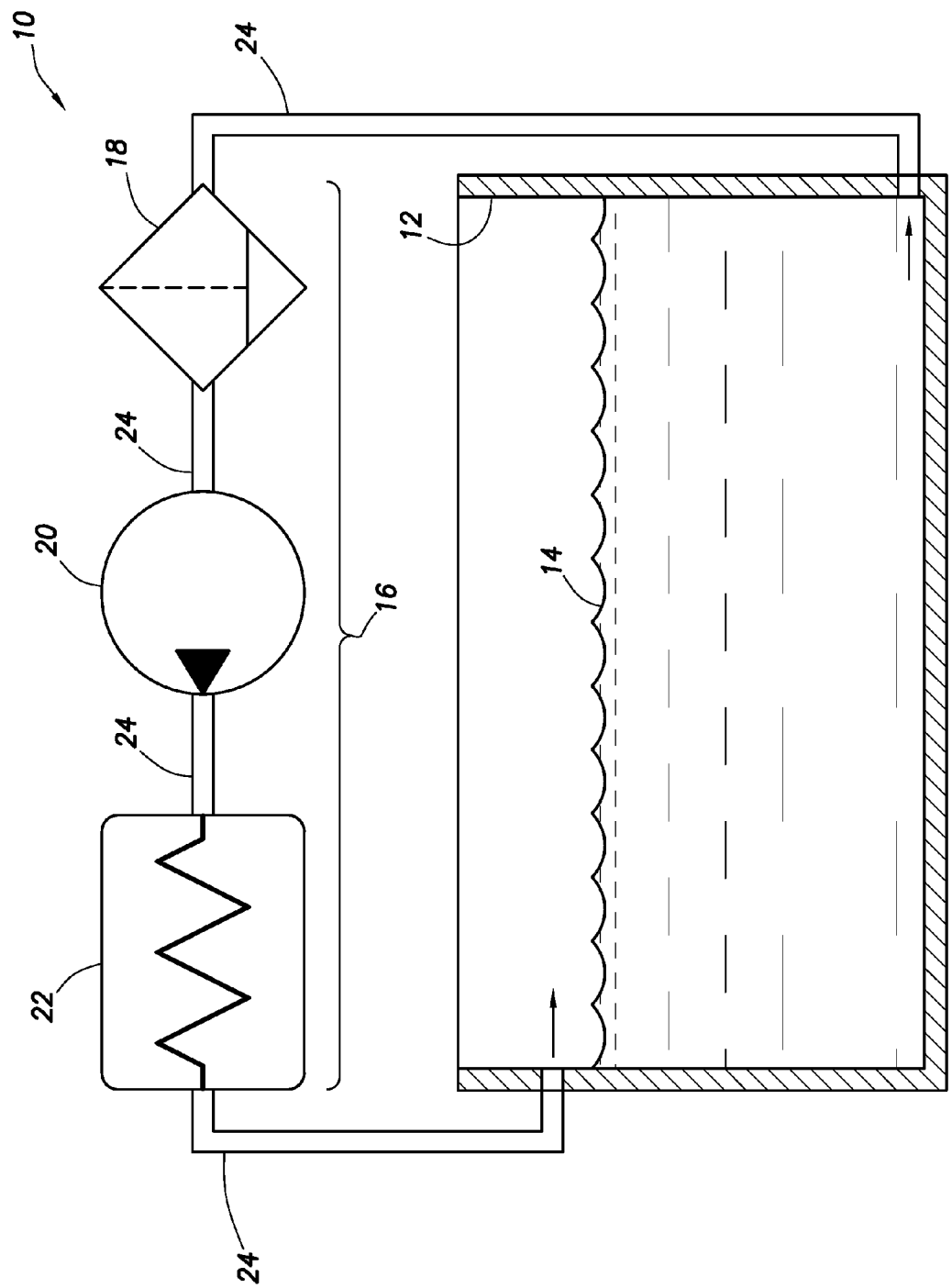
FIG. 1 is a representative partially cross-sectional view of a liquid reservoir system and monitoring method which can benefit from principles of this disclosure, the system including a liquid reservoir and associated equipment.

Representatively illustrated in FIG. 1 is a liquid reservoir system 10 and associated method which can embody principles of this disclosure. However, it should be clearly understood that the system 10 and method are merely one example of a possible application of the principles of this disclosure in practice, and a wide variety of other examples are possible. Therefore, the scope of this disclosure is not limited at all to the details of the system 10 and method described herein and/or depicted in the drawings.

In the FIG. 1 system 10, a reservoir 12 has a liquid 14 contained therein. The reservoir 12 could be a swimming pool, an ornamental pond, a chemical reservoir, or any other type of liquid reservoir. The scope of this disclosure is not limited to any particular liquid contained in any type of reservoir.

As depicted in FIG. 1, the reservoir 12 is open at its top, and so the liquid 14 can possibly evaporate from the reservoir. In addition, it is possible that a level of the liquid 14 could rise due to rain or addition of liquid by other means. However, the scope of this disclosure is not limited to use with reservoirs exposed to evaporation, rain or to any other means of increasing or decreasing a liquid level in the reservoirs.

The liquid 14 in the FIG. 1 example flows between the reservoir 12 and certain items of equipment 16. The equipment 16 includes a filter 18, a pump 20 and a heater 22. More, fewer, different and different combinations of equipment may be used in other examples.

One generally undesirable cause of a change in the liquid level in the reservoir 12 is leakage. For example, leakage could occur from the reservoir 12 itself, from any of the equipment 16, from conduits 24 connecting the reservoir and/or equipment, etc.

However, in some cases it may not be readily apparent that leakage is a cause of a decrease in the liquid level in the reservoir 12. For example, the liquid level decrease might be due to evaporation or another cause of removal of the liquid 14 from the reservoir 12 (or the equipment 16 or interconnecting conduits 24).

Thus, it will be appreciated that, in order to effectively mitigate an undesired condition (such as, leakage or evaporation of the liquid 14), it is very helpful to first identify the cause of the undesired condition. For example, time and expense could be wasted by attempting to prevent evaporation of the liquid 14 when the actual cause of a decrease in the liquid level is leakage from the conduits 24. Likewise, time and expense could be wasted in excavating and replacing the conduits 24, if the actual cause of a decrease in the liquid level is evaporation.

Figure 2:
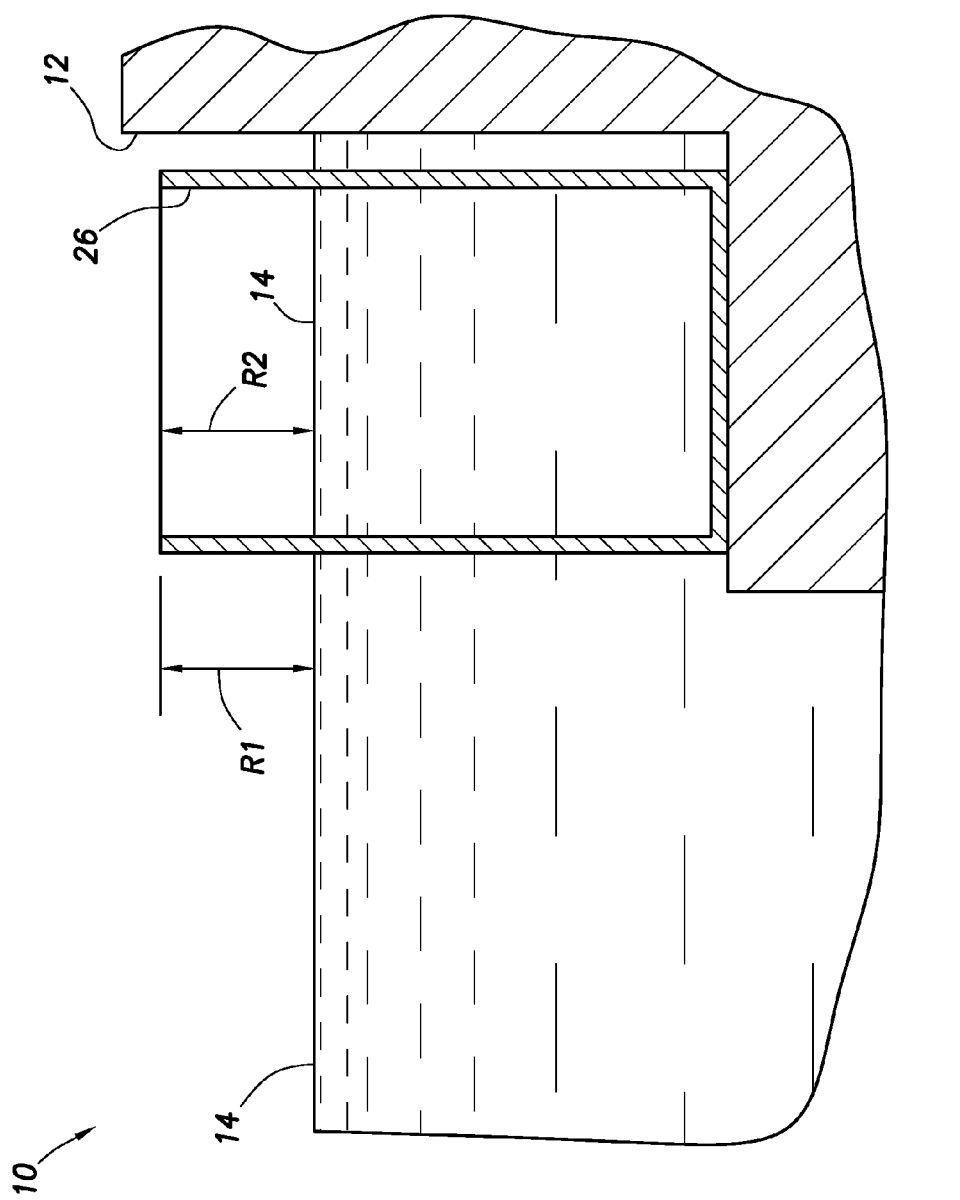
FIG. 2 is an enlarged scale cross-sectional view of another example of the system and method, in which another liquid reservoir is positioned in the reservoir of FIG. 1.

Referring additionally now to FIG. 2, an enlarged scale cross-sectional view of another example of the system 10 and method is representatively illustrated. In this example, a second reservoir 26 has been introduced into the first reservoir 12.

Preferably, in this example, the second reservoir 26 is positioned within (but isolated from) the first reservoir 12, so that the second reservoir is exposed to the same environmental conditions as the first reservoir. In this manner, the liquid 14 in the second reservoir 26 will experience the same conditions (temperature, barometric pressure, etc.) as the liquid in the first reservoir. However, in some examples, it may not be necessary for the second reservoir 26 to be positioned in the first reservoir 12 (e.g., the second reservoir could be directly adjacent to, above or below the first reservoir, etc.).

As depicted in FIG. 2, a level R1 of the liquid 14 in the first reservoir 12 as measured from a top of the second reservoir 26 is initially the same as a level R2 of the liquid in the second reservoir. Such an initial condition is convenient for description and explanation purposes, but as described more fully below, changes and differences in liquid level measurements are most important for evaluating the causes of those changes. Thus, it is not necessary for the liquid levels R1 and R2 to initially be the same, and it is also not necessary for these measurements to be taken relative to the top of the second reservoir 26, since any convenient reference position can be used in other examples.

Figure 3:
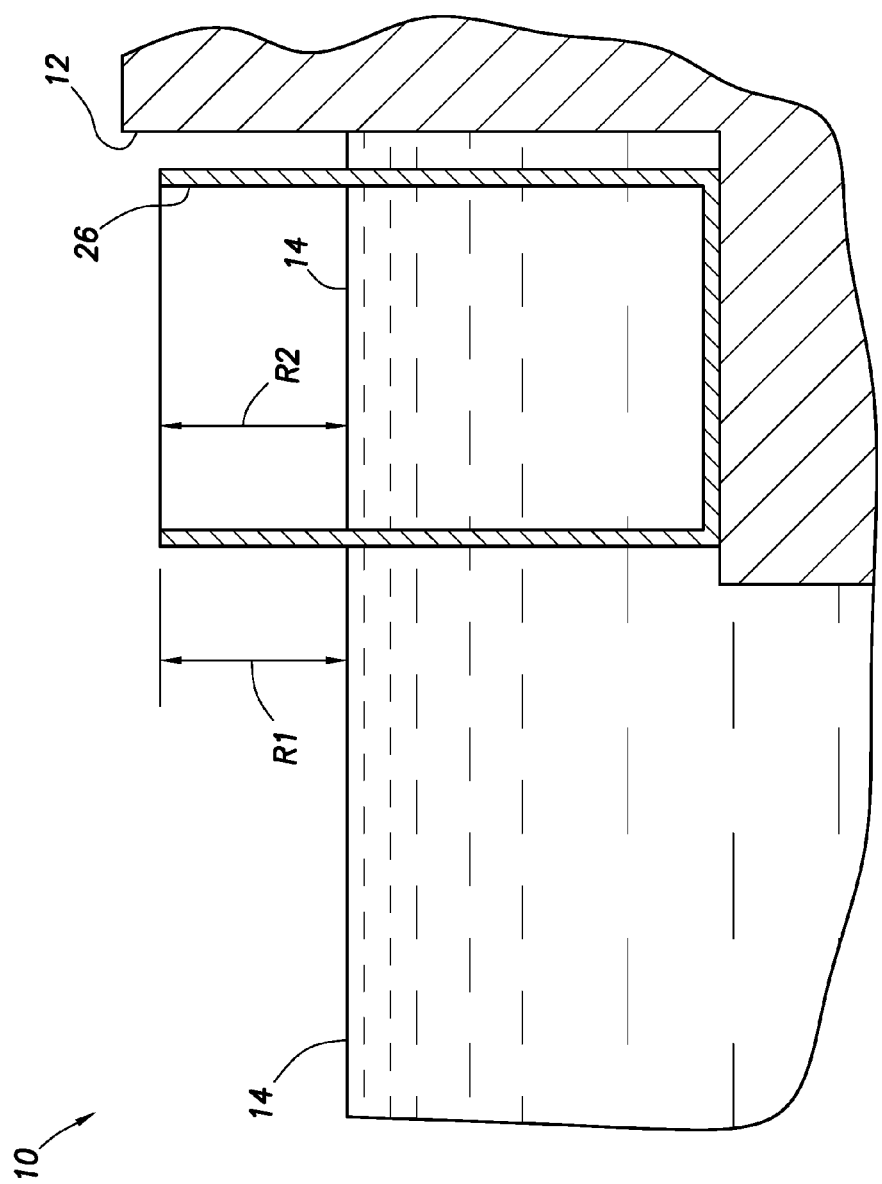
FIG. 3 is a cross-sectional view of the FIG. 2 system and method, in which liquid levels in the reservoirs have changed by a same amount.

Referring additionally now to FIG. 3, the system 10 is substantially similar to that depicted in FIG. 2, except that the levels of the liquid 14 in the two reservoirs 12, 26 have decreased (the measurements R1 and R2 have increased). In this example, the liquid levels R1 and R2 have changed by the same amount and remain equal.

Since the liquid 14 in the second reservoir 26 is physically isolated from the liquid in the first reservoir 12, it can be deduced that the cause for the liquid level decreases is due to environmental effects (such as evaporation) that act on the liquid in both of the reservoirs. Thus, if one desired to prevent such liquid level decreases in the future, one might take certain actions to mitigate the evaporation of the liquid 14 (for example, close off the top of the reservoir 12, reduce a temperature of the liquid, etc.).

Similarly, if the levels of the liquid 14 in the two reservoirs 12, 26 have increased by the same amount, it can be deduced that the cause for the liquid level increases is due to environmental effects (such as rain) that act on the liquid in both of the reservoirs.

Figure 4:
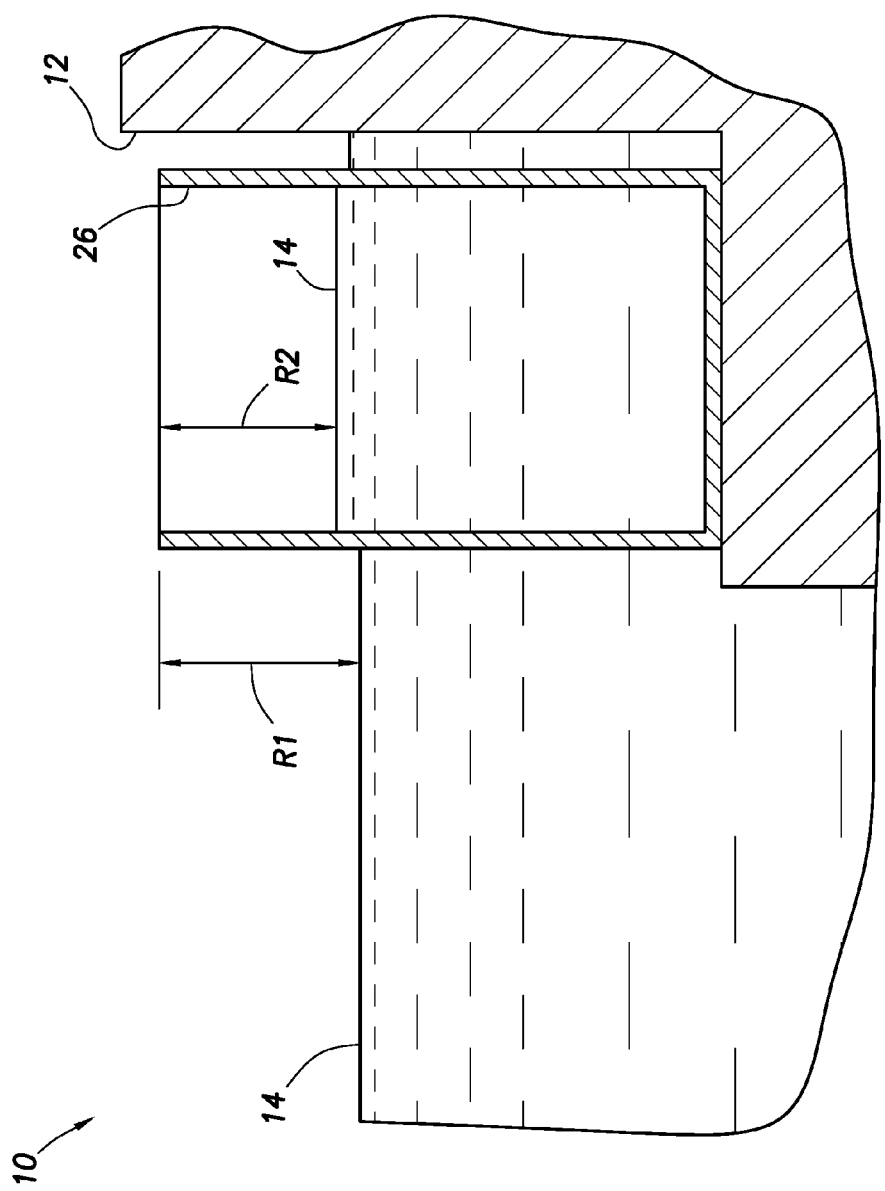
FIG. 4 is a cross-sectional view of the FIG. 2 system and method, in which liquid levels in the reservoirs have changed by different amounts.

Referring additionally now to FIG. 4, the system 10 is substantially similar to that depicted in FIG. 2, except that the level of the liquid 14 in the first reservoir 12 has decreased relative to the level of the liquid in the second reservoir 26 (the measurement R1 is now greater than the measurement R2). Thus, the liquid levels R1 and R2 have changed, but not by the same amount.

Since the liquid 14 in the second reservoir 26 is physically isolated from the liquid in the first reservoir 12, it can be deduced that the cause for the greater liquid level decrease in the first reservoir 12 is due to a cause (such as leakage from the reservoir 12, equipment 16 and/or conduits 24) that acts on the liquid in the first reservoir, but does not act on the liquid in the second reservoir. Thus, if one desired to prevent such liquid level decreases in the future, one might take certain actions to mitigate the leakage of the liquid 14 (for example, determine a location of the leakage, and repair or replace components as needed, etc.).

In some situations, the level of the liquid 14 in the first reservoir 12 could increase relative to the liquid level in the second reservoir 26. Such an increase in liquid level in the first reservoir 12 could be due to, for example, additions of liquid 14 to the reservoir (e.g., by an automatic filling device). Thus, if one detects such an increase of liquid level in the first reservoir 12 relative to the second reservoir 26, one might disable any automatic filling device prior to conducting further tests.

Figure 5:
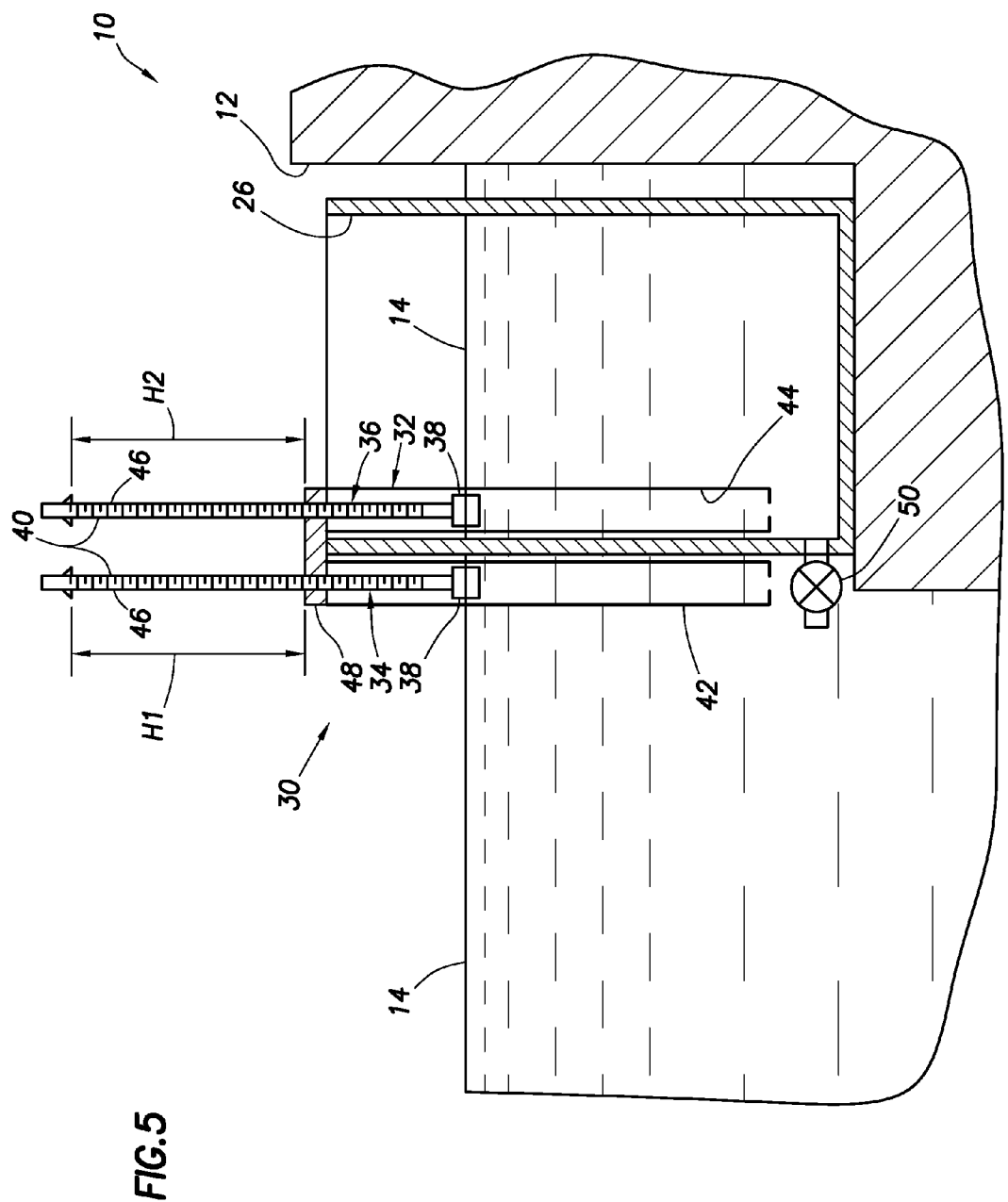
FIG. 5 is a cross-sectional view of liquid level monitoring system and method, in which a liquid level monitoring apparatus is disposed in each of the reservoirs.

Referring additionally now to FIG. 5, the reservoir system 10 is representatively illustrated with a system 30 for monitoring liquid level. The system 30 provides for convenient measurement of liquid levels in the reservoirs 12, 26 over time and can embody the principles of this disclosure. Although the monitoring system 30 is depicted as being used with the reservoir system 10, it should be understood that the system 30 may be used with any other reservoirs or systems of reservoirs.

In the FIG. 5 example, the system 30 includes a liquid level monitoring apparatus 32 that is partially immersed in both of the reservoirs 12, 26. In this manner, float devices 34, 36 of the apparatus 32 are exposed to the liquid levels in the respective reservoirs 12, 26.

Each of the float devices 34, 36 includes a float 38 and a stem 40. Each float 38 and stem 40 set could be integrally formed as a single element, or they may be separately formed. Thus, the scope of this disclosure is not limited to any particular details of the apparatus 32 as described herein or depicted in the drawings. For example, the stems 40 may not be provided in some embodiments, the floats 38 could be externally disposed (rather than internally disposed) on the apparatus 32 in some embodiments, etc.

The float devices 34, 36 are reciprocably received in respective laterally separated vertical float guides 42, 44. The float guides 42, 44 are representatively illustrated in FIG. 5 as being in the form of vertically oriented tubes or chambers, but in other examples the float guides may not comprise tubes or chambers. For example, the float guides 42, 44 could be in the form of vertically extending rods or other structures capable of vertically guiding the float devices 34, 36.

In the FIG. 5 example, the float guides 42, 44 are open at each opposite end, thereby allowing the liquid level in each float guide to be the same as in its respective reservoir 12, 26 (the float guide 42 is positioned in the reservoir 12, and the float guide 44 is positioned in the reservoir 26). If the float guides 42, 44 are not in the form of chambers or tubes, then the liquid levels exposed to the float devices 34, 36 may be otherwise equalized with the respective reservoirs 12, 26.

The float devices 34, 36 rise and fall in the float guides 42, 44 along with the liquid levels in the respective float guides and, thus, in the respective reservoirs 12, 26. The stems 40 extend upwardly out of the apparatus 32 and thereby provide for convenient monitoring of the levels of the float devices 34, 36 (and, thus, of the liquid levels in the reservoirs 12, 26).

Each of the stems 40 is provided with graduated longitudinal measurement markings 46. For example, one side of each stem 40 could be graduated in one-eighth inch increments, and an opposite side of each stem could be graduated in centimeter or millimeter increments. If the stems 40 are not used, the float guides 42, 44 could instead be graduated, or other components of the apparatus 32 could be graduated. Thus, the scope of this disclosure is not limited to any particular means of measuring the levels of the float devices 34, 36.

In the FIG. 5 example, the stems 40 extend reciprocably upward through an alignment structure 48. The alignment structure 48 could be integrally formed with the float guides 42, 44 in some examples.

The alignment structure 48 maintains the lateral separation of the float guides 42, 44, maintains longitudinal alignment of the float guides, and provides a convenient reference surface for measurements of the levels of the float devices 34, 36. For example, a measurement H1 from the alignment structure 48 to a top of one stem 40 (as indicated by the markings 46) can provide the level of the float device 34, and a measurement H2 from the alignment structure to a top of the other stem can provide the level of the float device 36. Of course, other reference positions may be used for such measurements, if desired.

In this example, changes in the measurements H1, H2 over a certain time period (such as, a day, multiple hours or days, etc.) can be recorded, and the changes can be compared to each other. As discussed above in regard to FIGS. 2-4, such changes in liquid level measurements can provide important information as to the causes of liquid level increases or decreases in the reservoir 12.

In order to ensure that the liquid levels in the reservoirs 12, 26 are initially the same, a valve 50 can be provided with the second reservoir 26. By opening the valve 50 before testing begins, fluid communication will be permitted between the reservoirs 12, 26, thereby allowing the liquid levels in the reservoirs to equalize. The valve 50 can then be closed, and the testing can commence. Note, however, that it is not necessary for the liquid levels in the reservoirs 12, 26 to be equalized, or for the valve 50 to be used for such equalization, in keeping with the scope of this disclosure.

Figure 6:
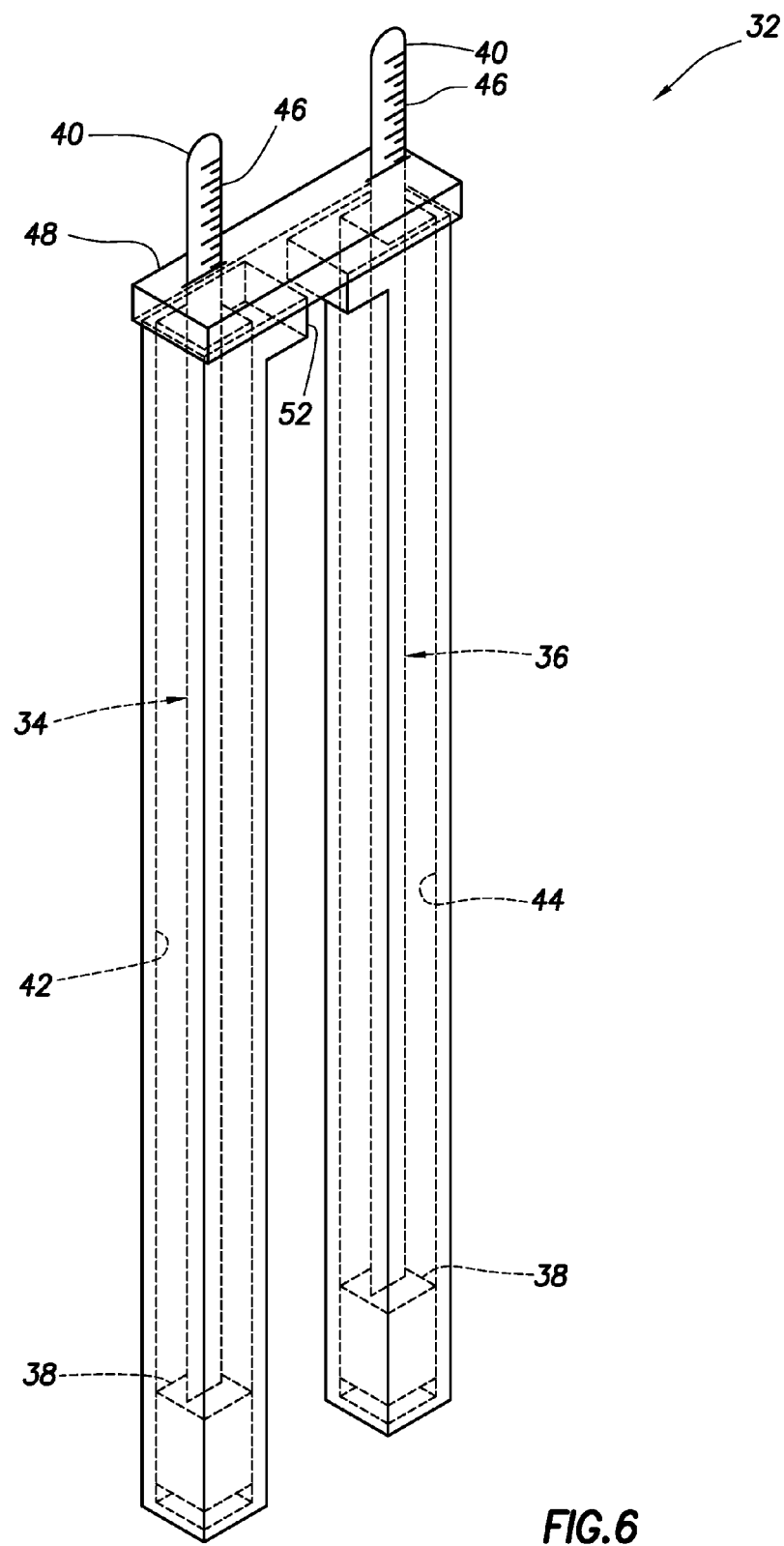
FIG. 6 is an isometric view of the liquid level monitoring apparatus, apart from the remainder of the system.

Referring additionally now to FIG. 6, another example of the apparatus 32 is representatively illustrated, apart from the remainder of the system 30. In this example, the floats 38 and the float guides 42, 44 have generally square (or at least rectangular) lateral cross-sections. In other examples, the float guides 42, 44 could have circular or otherwise shaped lateral cross-sections.

A laterally narrowed recess 52 is provided at upper ends of the float guides 42, 44 adjacent the alignment structure 48. The recess 52 serves to appropriately position the apparatus 32 at the top of the reservoir 26 and prevent the apparatus from tipping to one side or another. Thus, the recess 52 helps to maintain the float guides 42, 44 vertical in use.

In other examples, the recess 52 could be formed in the alignment structure 48 or another component of the apparatus 32. In some examples, the recess 52 may not be provided (e.g., the lateral spacing between the float guides 42, 44 may be sufficient to maintain the float guides vertical).

The apparatus 32 examples described above may be made of any suitable materials. For example, acrylics or other plastics may be used. If the apparatus 32 is to be exposed to sunlight for extended periods, then the selected materials may be ultraviolet radiation resistant.

It may now be fully appreciated that the above disclosure provides significant advancements to the art of liquid level monitoring for reservoirs. In examples described above, liquid level monitoring is convenient, with measurements of liquid levels over time in different reservoirs 12, 26 being readily accomplished.

The above disclosure provides to the art a liquid level monitoring apparatus 32. In one example, the apparatus 32 can include first and second laterally spaced apart elongated float guides 42, 44, first and second float devices 34, 36, each of the first and second float devices being at least partially reciprocably disposed in a respective one of the first and second float guides 42, 44, and an alignment structure 48 that maintains lateral separation and longitudinal alignment of the float guides.

Each of the first and second float guides 42, 44 has opposite longitudinal ends, and fluid communication may be permitted through each of the opposite longitudinal ends.

Each of the first and second float devices 34, 36 may comprise a float 38 and a stem 40. Each of the stems 40 may extend reciprocably through the alignment structure 48. Each of the stems 40 may be graduated with markings 46 of longitudinal measurement.

The apparatus 32 may also include a laterally narrowed recess 52 between the first and second float guides 42, 44 and proximate the alignment structure 48.

Each of the first and second float guides 42, 44 may have a generally rectangular or circular lateral cross-sectional shape.

A method of monitoring liquid 14 in a first reservoir 12 is also provided to the art by the above disclosure. In one example, the method can comprise: a) positioning a second reservoir 26 in the first reservoir 12, the liquid 14 in the first reservoir also being present in the second reservoir; b) partially immersing a liquid level monitoring apparatus 32 in the first and second reservoirs 12, 26, the apparatus including first and second float devices 34, 36, each of the first and second float devices thereby measuring a level of the liquid 14 in a respective one of the first and second reservoirs; c) recording a change in the level of the liquid 14 in the first reservoir 12 over a period of time, as indicated by the first float device measuring step; d) recording a change in the level of the liquid 14 in the second reservoir 26 over the same period of time, as indicated by the second float device measuring step; and e) comparing the change in the level of the liquid 14 in the first reservoir 12 to the change in the level of the liquid in the second reservoir 26.

The partially immersing step can include partially immersing first and second elongated float guides 42, 44 in the respective first and second reservoirs 12, 26. Each of the first and second float devices 34, 36 may be reciprocably disposed in a respective one of the first and second float guides 42, 44.

The first and second float guides 42, 44 can be laterally spaced apart from each other. An alignment structure 48 can maintain lateral separation and longitudinal alignment of the float guides 42, 44.

The method may include opening a valve 50, thereby equalizing the levels of liquid 14 in the first and second reservoirs 12, 26.

A system 30 for monitoring a liquid level in a first reservoir 12 is also described above. In one example, the system 30 can include a second reservoir 26 and a liquid level monitoring apparatus 32. The apparatus 32 can include first and second float devices 34, 36. Each of the first and second float devices 34, 36 measures the liquid level in a respective one of the first and second reservoirs 12, 26.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of monitoring liquid in a first reservoir, the method comprising:
   positioning a second reservoir in the first reservoir, the liquid in the first reservoir also being present in the second reservoir;

straddling a wall of the second reservoir with a liquid level monitoring apparatus, thereby partially immersing the liquid level monitoring apparatus in the first and second reservoirs, the apparatus including first and second float devices, each of the first and second float devices thereby indicating a level of the liquid in a respective one of the first and second reservoirs;

recording the level of the liquid in the first reservoir over a period of time, as indicated by the first float device;

recording the level of the liquid in the second reservoir over the same period of time, as indicated by the second float device; and comparing a first change in the level of the liquid in the first reservoir to a second change in the level of the liquid in the second reservoir.

2. The method of claim 1, wherein the partially immersing further comprises partially immersing first and second elongated float guides in the respective first and second reservoirs.

3. The method of claim 2, wherein each of the first and second float devices is reciprocably disposed relative to a respective one of the first and second float guides.

4. The method of claim 2, wherein the first and second float guides are laterally spaced apart from each other.

5. The method of claim 4, wherein the apparatus comprises an alignment structure that maintains lateral separation and longitudinal alignment of the float guides.

6. The method of claim 5, wherein each of the first and second float devices comprises a stem that extends reciprocably through the alignment structure.

7. The method of claim 1, further comprising opening a valve, thereby equalizing the levels of liquid in the first and second reservoirs.

8. The method of claim 7, further comprising closing the valve, thereby isolating the liquid in the second reservoir from the liquid in the first reservoir.

9. A method of monitoring liquid in a first reservoir, the method comprising:

positioning a second reservoir in the first reservoir, the liquid in the first reservoir also being present in the second reservoir;

partially immersing a liquid level monitoring apparatus in the first and second reservoirs, the apparatus including first and second float devices, each of the first and second float devices thereby indicating a level of the liquid in a respective one of the first and second reservoirs;

recording a change in the level of the liquid in the first reservoir over a period of time, as indicated by the first float device;

recording a change in the level of the liquid in the second reservoir over the same period of time, as indicated by the second float device; and comparing the change in the level of the liquid in the first reservoir to the change in the level of the liquid in the second reservoir, wherein the partially immersing further comprises partially immersing first and second elongated float guides in the respective first and second reservoirs, wherein the first and second float guides are laterally spaced apart from each other, wherein the apparatus comprises an alignment structure that maintains lateral separation and longitudinal alignment of the float guides, wherein each of the first and second float devices comprises a stem that extends reciprocably through the alignment structure, and wherein each of the stems is graduated with markings of longitudinal measurement.

10. A system for monitoring a liquid level in a first reservoir, the system comprising:

a second reservoir; and a liquid level monitoring apparatus which straddles a wall of the second reservoir, the apparatus including first and second float devices, wherein each of the first and second float devices indicates the liquid level in a respective one of the first and second reservoirs, and wherein the second reservoir includes a valve that selectively permits and prevents fluid communication between an interior and an exterior of the second reservoir.

11. The system of claim 10, wherein the apparatus further includes first and second laterally spaced apart elongated float guides.

12. A system for monitoring a liquid level in a first reservoir, the system comprising:

a second reservoir; and a liquid level monitoring apparatus which straddles a wall of the second reservoir, the apparatus including first and second float devices, wherein each of the first and second float devices indicates the liquid level in a respective one of the first and second reservoirs, wherein the apparatus further includes first and second laterally spaced apart elongated float guides, and wherein each of the first and second float devices is reciprocably disposed at least partially in a respective one of the first and second float guides.

13. The system of claim 12, wherein each of the first and second float devices comprises a stem that extends reciprocably through an alignment structure that maintains lateral separation and longitudinal alignment of the first and second float guides.

* * * * *